US007794349B2

(12) United States Patent
Gierer et al.

(10) Patent No.: US 7,794,349 B2
(45) Date of Patent: Sep. 14, 2010

(54) GEAR CONTROL DEVICE

(75) Inventors: Georg Gierer, Kressbronn (DE); Thilo Schmidt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 465 days.

(21) Appl. No.: 11/908,689

(22) PCT Filed: Mar. 4, 2006

(86) PCT No.: PCT/EP2006/001993

§ 371 (c)(1),
(2), (4) Date: Feb. 11, 2008

(87) PCT Pub. No.: WO2006/097209

PCT Pub. Date: Sep. 21, 2006

(65) Prior Publication Data

US 2009/0215587 A1   Aug. 27, 2009

(30) Foreign Application Priority Data

Mar. 18, 2005   (DE) .................. 10 2005 012 590

(51) Int. Cl.
F16H 31/00   (2006.01)
F16H 61/16   (2006.01)
F16H 61/18   (2006.01)

(52) U.S. Cl. ............... 475/119; 475/120; 475/121; 475/122; 477/125

(58) Field of Classification Search .............. 475/116, 475/118–122, 127, 128, 133; 477/70, 71, 477/125, 127, 156; 701/62
See application file for complete search history.

(56) References Cited

U.S. PATENT DOCUMENTS

| 4,896,568 | A | * | 1/1990 | Gierer | ........................ 477/138 |
| 4,981,052 | A | * | 1/1991 | Gierer | ........................ 477/125 |
| 5,005,445 | A | * | 4/1991 | Gierer | ........................ 477/126 |
| 5,417,626 | A |   | 5/1995 | Gierer |   |
| 5,674,153 | A |   | 10/1997 | Jang |   |

(Continued)

FOREIGN PATENT DOCUMENTS

| DE | 195 43 732 A1 | 5/1996 |
| DE | 198 58 540 A1 | 6/2000 |
| DE | 198 58 541 A1 | 6/2000 |
| DE | 198 58 543 A1 | 6/2000 |
| EP | 1 431 626 A1 | 6/2004 |
| JP | 09-32913 | 2/1997 |

*Primary Examiner*—Tisha D Lewis
(74) *Attorney, Agent, or Firm*—Davis & Bujold, P.L.L.C.

(57) ABSTRACT

An automatic transmission control device with a hydraulic control system controlled by an electric transmission control device. The system including several pressure control valves, actuated electrically by the transmission control device, and several switching valves and pressure regulation valves, actuated by hydraulic pilot pressure, which is adjustable with the pressure control valves. Each shift element is associated with one of the pressure control valve. An engagement prevention valve is actuated by one of a control pressure of the first shift element and a pressure signal equivalent to the control pressure of the first shift element to engage the reverse drive gear. A pressure supply line of the second shift element for obtaining the reversing gear is blocked when the engagement prevention valve is in its first switch position and open when the engagement prevention valve is in its second switch position.

13 Claims, 6 Drawing Sheets

U.S. PATENT DOCUMENTS

| | | | |
|---|---|---|---|
| 6,206,802 B1 * | 3/2001 | Kim | 477/127 |
| 6,464,610 B1 * | 10/2002 | Hisano et al. | 475/119 |
| 6,527,670 B1 | 3/2003 | Gierer et al. | |
| 6,544,139 B1 | 4/2003 | Gierer et al. | |
| 6,746,355 B2 * | 6/2004 | Shin et al. | 475/119 |
| 7,736,270 B2 * | 6/2010 | Gierer et al. | 477/175 |

* cited by examiner

| | A1 | B1 | C1 | D1 | 5 | E1 | A | B | C | D | E |
|---|---|---|---|---|---|---|---|---|---|---|---|
| Pos P | 0 | 0 | 0 | 1 | 0 | 0 | 0 | 0 | 0 | 1 | 0 |
| Pos N | 0 | 0 | 0 | 1 | 0 | 0 | 0 | 0 | 0 | 1 | 0 |
| Pos R | 0 | 1 | 0 | 1 | +/- | 0 | 0 | 1 | 0 | 1 | 0 |
| 1" | 1 | 0 | 0 | 1 | +/- | 0 | 1 | 0 | 0 | 1 | 0 |
| 2" | 1 | 0 | 1 | 0 | +/- | 0 | 1 | 0 | 1 | 0 | 0 |
| 3" | 1 | 1 | 0 | 0 | +/- | 0 | 1 | 1 | 0 | 0 | 0 |
| 4" | 1 | 0 | 0 | 0 | +/- | 1 | 1 | 0 | 0 | 0 | 1 |
| 5" | 0 | 1 | 0 | 0 | +/- | 1 | 0 | 1 | 0 | 0 | 1 |
| 6" | 0 | 0 | 1 | 0 | +/- | 1 | 0 | 0 | 1 | 0 | 1 |

Fig. 4

GEAR CONTROL DEVICE

This application is a national stage completion of PCT/EP2006/001993 filed Mar. 4, 2006, which claims priority from German Application Serial No. 10 2005 012 590.5 filed Mar. 18, 2005.

FIELD OF THE INVENTION

The invention concerns a control device for a transmission, in particular for an automatic transmission of a vehicle.

BACKGROUND OF THE INVENTION

From DE 198 58 541 A1 and DE 198 58 543 A1 electro-hydraulic transmission control devices for six-gear automatic transmissions with five shift elements are known, in which shift elements are engaged in the force flow of a drivetrain of a vehicle both to produce transmission gears for forward driving and to produce at least one reverse gear.

A disadvantage here, however, is that in the event of a wrong command in the transmission at any time, even without a corresponding driver's wish indication, a change from a gear for forward driving to the at least one gear for reverse drive can take place, where unsafe driving situations can be created and unacceptably large loads in the drivetrain of a vehicle can result in component damage.

To prevent an undesired gear change in a transmission, pressure sensors or valve displacement sensors, are provided such that a wrong command from a transmission control device can be recognized before a gear change. Thus, the transmission is constructed with a fail-safe, but this is elaborate and cost-intensive.

In addition, in the transmission control devices known from the prior art, two of the shift elements are alternatively controlled by a common pressure control valve. As a result of the connections between the pressure control valve and the shift elements, it's controls are respectively temporarily cut off during the alternating control, and air collects in the connection lines between the pressure control valve and the shift elements controlled by it. In practice, these air accumulations can only be removed by elaborate means or prevented by appropriate hydraulic measures which entail high costs. Furthermore, the change between the two procedures can only be effected by actuating a correspondingly modified electro-hydraulic transmission control device in a very elaborate manner.

Accordingly, the purpose of the present invention is to provide a transmission control device such that both an undesired shift in the transmission between gears for forward driving and a reverse drive gear and air accumulations can be reliably prevented inexpensively and with little control and regulation effort.

SUMMARY OF THE INVENTION

A control device for a transmission, in particular an automatic transmission of a vehicle, is formed with a hydraulic control system that can be operated by an electric transmission control device. The control system comprising several pressure control valves that can be electrically actuated by the transmission control device and several shift valves and pressure regulation valves, each of which can be actuated by a hydraulic pilot pressure which can be adjusted by the pressure control valves. In addition, by way of the hydraulic control system and as a function of a gear shift lever position in a manual selector gate, several shift elements can be actuated by a hydraulic actuation pressure in such manner that, in each case, by virtue of engaging at least two shift elements at the same time in the force flow of a transmission, various gear ratios of the transmission for driving forward or in reverse can be obtained. At least one gear for reverse drive can be obtained by way of two simultaneously engaged shift elements, which are respectively provided in combination with at least one or more of the shift elements for obtaining a gear for driving forward.

Since each of the shift elements is associated with a separate pressure control valve, the air accumulations known from the prior art are avoided in a simple and inexpensive manner in the hydraulic control system of the control device according to the invention.

Furthermore, in a simply designed manner and with low expenditure on control and regulating means, the transmission control device prevents undesired gear changes from a forward gear to a reverse gear.

To do this the control device is made with an engagement prevention valve, which can be acted upon, in the direction of a first switch position against a spring device, with an actuating pressure of the first shift element used for obtaining the reverse gear and can be actuated in the direction of a second switch position with a pressure signal equivalent to the actuating pressure of the first shift element used for obtaining the reverse gear so that a pressure supply line of the second element used for obtaining the reverse gear is blocked in the first switch position of the engagement prevention valve and opened in the second switch position of the switching valve.

In this way a wrong command of the shift elements of a transmission is avoided both in a gearshift lever position for forward driving and in a gearshift lever position for reverse drive, by way of a hydraulically actuated switching valve preferably of conventional design which, as necessary, allows or prevents the simultaneous engagement of the two shift elements used to obtain the reverse driving gear.

BRIEF DESCRIPTION OF THE DRAWINGS

The invention will now be described, by way of example, with reference to the accompanying drawings. For the sake of clarity, in the description of the various example embodiments, the same references are used for components with the same structure and function. The drawings show:

FIG. 4 is a switching logic of the control device according to the invention illustrated in FIGS. 1, 2 and 3;

DETAILED DESCRIPTION OF THE INVENTION

Figure 1:
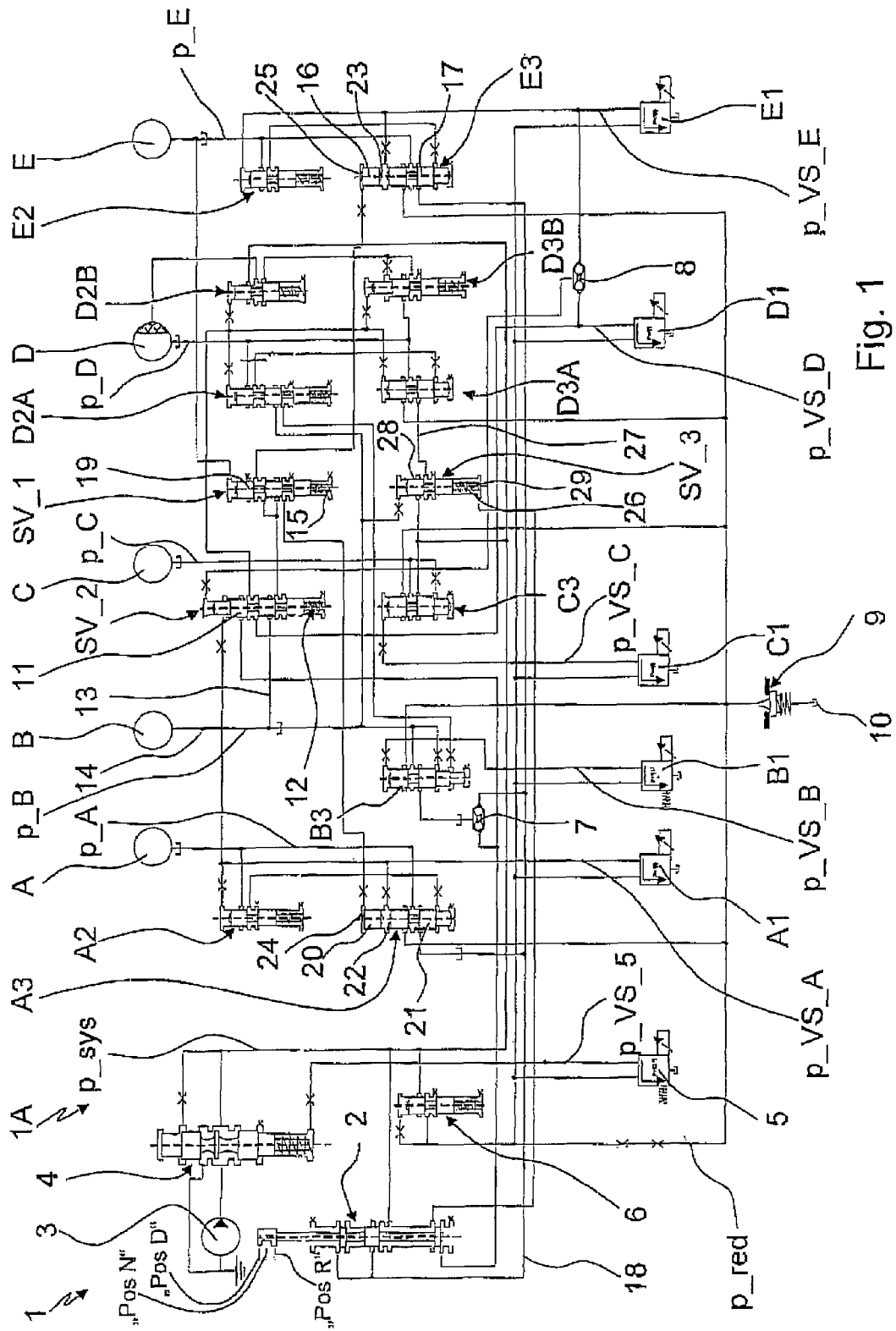
FIG. 1 is simply represented hydraulic control scheme of the transmission control device according to the invention.
Figure 2:
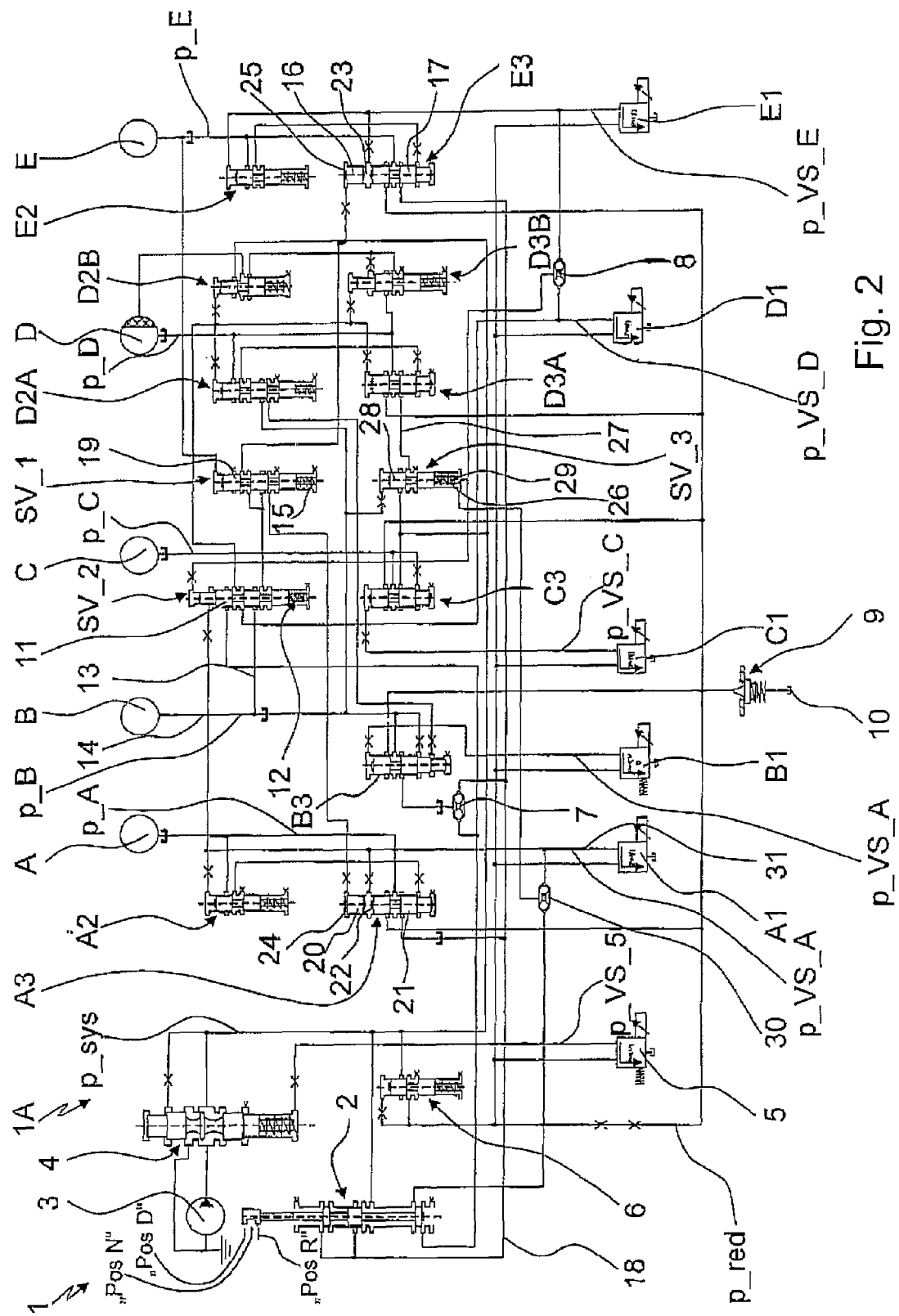
FIG. 2 is simply represented hydraulic control scheme of a second embodiment of the control device according to the invention.

FIG. 1 and FIG. 2 schematically represent a hydraulic control scheme of an electro-hydraulic control device 1, which is provided for the control of a transmission (not shown in more detail) preferably made as an automatic transmission, and which comprises a hydraulic control system 1A. In accordance with the shift logic shown in FIG. 4, in the automatic transmission six forward gears "1", "2", "3", "4", "5", "6" and one reverse gear "R" can be obtained by correspondingly engaging and disengaging five shift elements A, B, C, D and E, the respective gears to be engaged being so engaged as a function of a driver's wish indication generated by a gearshift switch 2 and as a function of various shift strategies stored in an electric transmission control device (also not represented in detail).

Below, the object of the invention is described in more detail first with reference to the control scheme of FIG. 1; the control schemes in FIG. 2 and FIG. 3 differ from the control scheme in FIG. 1 only in some areas, so that in the later description relating to FIG. 2 and FIG. 3 reference will only be made to those parts, while otherwise reference can be made to the description of FIG. 1 given below.

The gearshift switch 2 shown can be moved to various gearshift lever positions "Pos D", Pos P", Pos N", "Pos R", such that in the gearshift lever position "Pos D" the gears "1" to "6" for forward driving can be engaged in the automatic transmission. In the second selector lever position "Pos N" a force flow of a drivetrain of a vehicle is interrupted in the area of the automatic transmission in such manner that essentially no torque can be transmitted by the automatic transmission from the drive output toward the drive engine or in the opposite direction.

In the third selector lever position "Pos R", the gear "R" for reverse drive is engaged in the automatic transmission, while in the fourth selector lever position "Pos P" (not shown in more detail), a mechanical parking lock is engaged with which the drive output of a vehicle is kept rotationally fixed in a manner known as such.

In addition, a hydraulic pump 3 is provided by way of which, in a manner known as such, in combination with a system pressure valve 4 located downstream from the hydraulic pump, which is designed as a pressure-limiting valve, a system pressure $p\_sys$ can be made available for the actuation of the shift elements A to E.

Furthermore, the electro-hydraulic control device 1 comprises several pressure control valves A1, B1, C1, D1 and E1, which can be actuated electrically by the electric transmission control device, being opened or closed when energized in accordance with their design, and of which, respectively, one is associated with each shift element A, B, C, D, E. A pressure control valve 5 is associated with the system pressure valve 4, such that when the transmission control device is active, the system pressure $p\_sys$ can be modulated by a pilot pressure $p\_VS\_5$, the pressure control valve 5 being fully opened in the unenergized condition and the system pressure $p\_sys$ being set to its maximum pressure value. In the energized condition of the pressure control valve 5, the system pressure $p\_sys$ is set as a function of the electric actuation by the pressure control valve 5, as a function of a control command of the electric transmission control device. In addition, several switching valves A2, D2A, D2B, E2, SV_1, SV_2 and SV_3 and several pressure regulation valves A3, B3, C3, D3A, D3B and E3 are provided.

Downstream from the system pressure valve 4 is provided the reducing valve 5 designed as a pressure reduction valve 6 such that a reducing pressure $p\_red$ that can be fed to the pressure control valves 5, A1, B1, C1, D1 E1 is regulated.

When the transmission control device is active and as a function of the energization of the pressure control valves 5, A1, B1, C1, D1 and E1, the control pressure $p\_red$ respectively applied to the pressure control valves 5, A1, B1, C1, D1, E1 is passed on in correspondingly modified form to the system pressure valve 4, the switching valves and the pressure regulating valves of the electro-hydraulic control device 1 as a pilot pressure $p\_VS$, the respective pilot pressure $p\_VS$ delivered for the shift element A to E being here denoted by adding the index of the corresponding shift element A to E so that, for example the pilot pressure $p\_VS\_A$, is the pilot pressure for shift element A.

In addition, the electro-hydraulic control device 1 comprises OR valves 7 and 8, each having two incoming and one outgoing line such that the incoming line connected by the OR valve 7 or 8 is, in each case, that line in which the hydraulic pressure is highest. Furthermore, downstream from the reducing valve 6 and between the reducing valve 6 and a pressure medium reservoir or oil sump 10 of the automatic transmission, there is arranged a pressure limiting valve 9 made as a plate valve such that, in the hydraulic system of the electro-hydraulic control device 1, a pre-filling pressure preferably of about 0.25 bar is maintained in order to prevent air from getting into the hydraulic line system of the electro-hydraulic control device 1.

As a function of a gearshift lever position of the gearshift switch 2, the pressure control valves 5, A1, B1, C1, D1 and E1 and the shift elements A to E are actuated in accordance with the shift logic, shown in tabulated form in FIG. 4, in which, in each case, the digit 0 indicates an inactive condition and the digit 1 an active condition of the component concerned in the shift logic.

Thus for example, when the first gear "1" is called for, the pressure control valve A1 is opened in the energized condition, i.e., when the transmission control device is active and, as a function of the energization of the control pressure $p\_red$ applied by the reducing valve 6, this pressure is passed on in correspondingly modified form to the switching valve A2 that has only two switch positions and to the pressure regulation valve A3 of shift element A.

The pressure control valve A1 is energized in such a manner that the switching valve A2 and the pressure regulation valve A3 are each acted upon by a pilot pressure $p\_VS\_A$ and the system pressure $p\_sys$ applied to the pressure regulation valve A3 by virtue of the gearshift switch 2 is passed in the required manner to the shift element A as an actuating pressure $p\_A$.

At the same time, the pressure control valve D1, which is also open when energized, is electrically actuated by the transmission control device to the extent required for the engagement of shift element D so that the control pressure $p\_red$ is adapted to a pilot pressure $p\_VS\_D$ needed for this and the switching valves D2A, D2B and the pressure regulation valves D3A, D3B are actuated by the pilot pressure $p\_VS\_D$. In turn, the result of the actuation is that the system pressure $p\_sys$ applied, via the switching valve $SV\_3$ to the pressure regulation valve D2A, as the actuating pressure $p\_D$ of the shift element D, is applied to the latter at the necessary level for the engagement of the shift element D.

In addition, the shift logic, depicted in FIG. 4, has fields marked with the sign "+/−", this sign in each case indicating a regulation phase of the corresponding component of the electro-hydraulic control device 1 while the transmission control device is active and, for that reason components so characterized unlike the other elements, cannot be assigned exactly to a particular shift logic situation.

The various gears "1" to "6" for forward driving and the gear "R" for reverse drive are each obtained by engaging two automatic transmission shift elements simultaneously in the force flow of the transmission, the gears "1" to "3" being assigned to a first transmission ratio range and the gears "4" to "6" to a second transmission ratio range. In the present case, the gear "R" for reversing is the sole gear assigned to a third transmission ratio range.

Moreover, it is apparent from the shift logic that to obtain the gears "1" to "3" of the first ratio range, shift element A is engaged in the force flow of the transmission together, respectively, with shift element D, shift element C or shift element B while, to obtain the gears "4" to "6" of the second ratio range, shift element E is engaged in the force flow together, respectively, with another shift element A, B or C. In this case, the reverse gear "R" is obtained by the simultaneous engagement of shift elements B and D in the transmission.

From this, it can also be seen that shift element B is engaged in the force flow of the automatic transmission in combination with shift element A to obtain the third gear "3" of the first ratio range, in combination with shift element E to obtain gear "5" of the second ratio range and also in combination with shift element D to obtain the gear "R" for reverse drive.

To reliably prevent theoretically possible wrong automatic transmission commands, in which the gearshift switch 2 is set in the gearshift lever position "Pos D" and the gear "R" for reversing is erroneously engaged in the automatic transmission or in which one of the gears "1", "3" or "5" for forward driving is engaged in the transmission even though the gearshift switch 2 is in the gearshift lever position "Pos R" for reverse drive, in the electro-hydraulic control device 1, according to the invention, the switching valve indexed SV_3 is provided as an engagement prevention valve.

Figure 3:
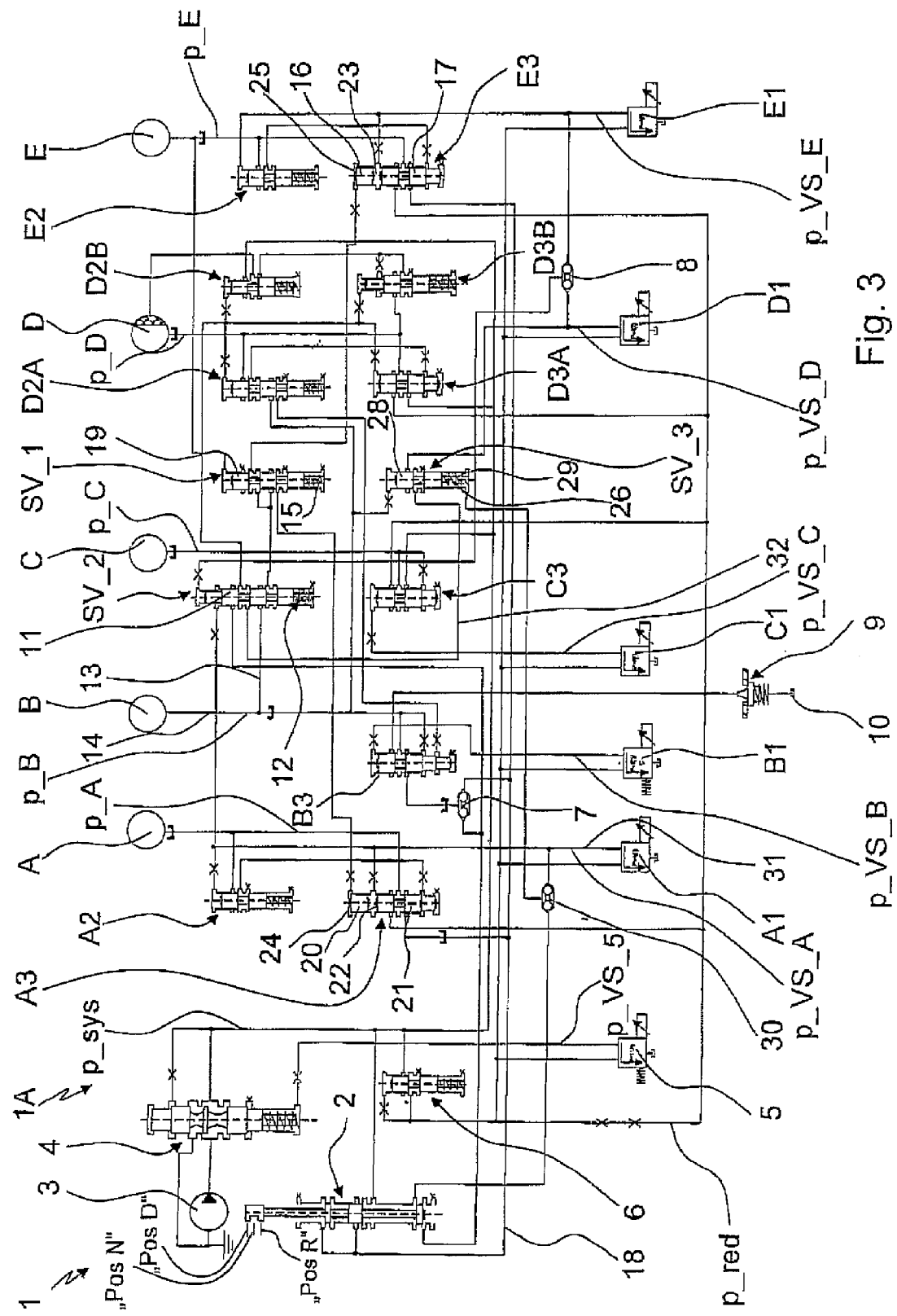
FIG. 3 is a hydraulic control scheme of a third embodiment of the control device according to the invention.

In the present case, the engagement prevention valve SV_3 can be acted upon in the direction of a first switch position, shown more clearly in FIG. 1, FIG. 2 and FIG. 3 against a spring device 26, by the actuation pressure p_B of the first shift element B for obtaining the reverse drive gear "R", starting from a control line 14 of the shift element B which runs between the pressure regulation valve B3 of shift element B and an actuating piston (not shown in more detail) of the shift element B made as a frictional shift element.

Furthermore, the engagement prevention valve SV_3 can be actuated in the direction of a second switch position by a pressure signal equivalent to the actuation pressure p_B of the first shift element B for obtaining the reverse drive gear "R", this pressure signal corresponding in all the example embodiments of the control device 1 shown in the drawing to the system pressure p_sys set by way of the system pressure valve 4, which is applied to the engagement prevention valve SV_3 by the system pressure valve 4 by virtue of the gearshift switch 2 when the gearshift lever is in position "Pos R" for reverse drive. This pressure signal, transmitted to the engagement prevention valve SV_3 by virtue of the gearshift 2 and corresponding to the system pressure p_sys, is not transmitted to the engagement prevention valve SV_3, via the gearshift switch 2, when the gearshift lever of the gearshift lever 2 is in the position "Pos D" for forward driving.

In the first switch position of the engagement prevention valve SV_3, shown in FIG. 1 and FIG. 2, a pressure supply line 27, through which the system pressure p_sys set up by the system pressure valve 4 can be passed toward the pressure regulation valve D3A, is blocked so that the second shift element D required for obtaining the reverse drive gear "R" cannot be acted upon by the actuating pressure p_D needed for its engagement.

In the second, fully reversed switch position of the engagement prevention valve SV_3 the pressure supply line 27 of shift element D is open, so the pressure regulating valves D3A applied on the system pressure p_sys, as a function of the pilot pressure p_VS_D set by the pressure control valve D1, can be passed at a correspondingly adapted level to the shift element D as it actuation pressure.

The switching of the engagement prevention valve SV_3 described above has the advantageous consequence that the first shift element B. In the second shift element D for obtaining the reverse drive "R" can only be simultaneously engaged in the force flow of the automatic transmission when the gearshift lever of the gearshift switch 2 is in position "Pos R" for reverse drive. This results from the fact that in this position of the gearshift switch 2 the pressure signal p_sys is applied to the engagement prevention valve SV_3 in the direction of its second switch position and the actuation pressure of the shift element B acts at the same time on the valve slide 28 of the engagement prevention valve SV_3 in the direction of the first switch position of the engagement prevention valve SV_3.

On the valve slide 28 of the engagement prevention valve SV_3, when the gearshift lever of the gearshift switch 2 is in the position "Pos R" for reverse drive, there acts a total force component resulting from the area ratio of the valve slide 28 and the control pressures p_sys and p_B applied on the active surfaces of the valve slide 28, and from the spring force device 26, which, when the shift element B is engaged, moves the valve slide 28 to the second switch position of the engagement prevention valve SV_3, whereby the shift element D and the shift element B can both be engaged simultaneously in the force flow of the automatic transmission in order to obtain the reverse drive "R".

In the position "Pos D" of the gearshift lever of the gearshift switch 2 for forward driving, the connection between the system pressure valve 4 and a control space 29 of the engagement prevention valve SV_3, in which the spring device 26 of the engagement prevention valve SV_3 is also accommodated, is interrupted so that above a threshold valve p_B_thr1 of the actuation pressure p_B of the shift element B, which will be explained further in the description of FIG. 41 the valve slide 28 of the engagement prevention valve SV_3 is moved against the spring device 26 into the first switch position shown in FIG. 1, FIG. 2 and FIG. 3 and the supply of pressure to the second shift element D for obtaining the reverse drive "R" with the system pressure p_sys is effectively cut off in the area of the engagement prevention valve SV_3.

This reliably prevents a simultaneous engagement of the shift elements B and D when the driver has called for forward driving, in all the operating ranges of the automatic transmission and the electro-hydraulic control device 1. In addition, the engagement of gears "1" to "6" for forward driving, when the gearshift lever of the gearshift switch 2 is in position "Pos R", is effectively prevented, because the shift elements A and E, which have to be engaged in the force flow at the same time as the shift element B or the shift element D in order to obtain gears "1" to "6" for forward driving, are not acted upon by the system pressure p_sys needed for their engagement.

Alternatively, however, it can also be provided that, by way of the engagement prevention valve SV_3, a pilot pressure line 32, shown in FIG. 3 between the pressure control valve D1 and the pressure regulation valves D3A, D3B and the switching valves D2A and D2B, through which the pilot pressure p_VS_D is applied to the pressure regulation and switching valves, is blocked or opened, as described earlier, depending on the control pressure p_B applied by the shift element B, the system pressure p_sys transmitted as a function of operating condition by the gearshift switch 2, and the spring force of the spring device 26 of the engagement prevention valve SV_3, in order to effectively prevent the simultaneous engagement of the shift elements B and D when forward driving has been selected.

In addition, in the second and third example embodiments of the electro-hydraulic control device 1, shown in FIGS. 2 and 3, an OR valve 30 made as a ball valve is provided between the control space 29 of the engagement prevention valve SV_3 and the gearshift switch 2, one of whose incoming lines is connected to the gearshift switch 2 and whose other incoming line is connected to a pilot pressure line 31 through which the pilot pressure p_VS_A that can be set by the pressure control valve A1 can be passed to the pressure regulation valve A3 and the switching valve A2 of shift element A. The outgoing line from the OR valve 30 is connected directly to the control space 29 of the engagement prevention valve SV_3, so that the control space 29 of the engagement prevention valve SV_3 is in active connection either with the gearshift switch 2 or with the pilot pressure line 31 and the valve slide 28 is acted upon, on the same active surface, by the pressure signal p_sys or the other pressure signal p_VS_A. Of course, it is at the discretion of a person with knowledge of the subject to direct the pressure signal and the other pressure signal onto different active surfaces of the valve slide of the engagement prevention valve, in a manner not shown in any greater detail.

With this procedure, the valve characteristic of the engagement prevention valve SV_3 when the driver has selected forward driving, can be varied in such a manner that when forward driving has been selected, the transmission capacity of the shift elements B and D can be raised at the same time to a predefined level above the first pressure threshold valve p_B_thr 1 in order to enable a brief overlap of the two shift elements B and D, as takes place during multiple shifts.

The additional possibility, when forward driving has been selected, of acting upon the control space 29 of the engagement prevention valve SV_3 with the pilot pressure, leads to the increase of the reaction pressure level of the engagement prevention valve SV_3, shown in FIG. 4 from the first pressure threshold valve p_B_thr 1, which corresponds to the spring force of the spring device 26 of the engagement prevention valve SV_3, to a second pressure threshold valve p_B_thr 2. This second pressure threshold valve p_B_thr 2 of the actuation pressure p_B of the shift element B corresponds to the opposing force that results respectively from the spring force of the spring device 26 and the pilot pressure p_VS_A of the shift element A, above which the engagement prevention valve SV_3 switches over from its second switch position to its first switch position.

Figure 5:
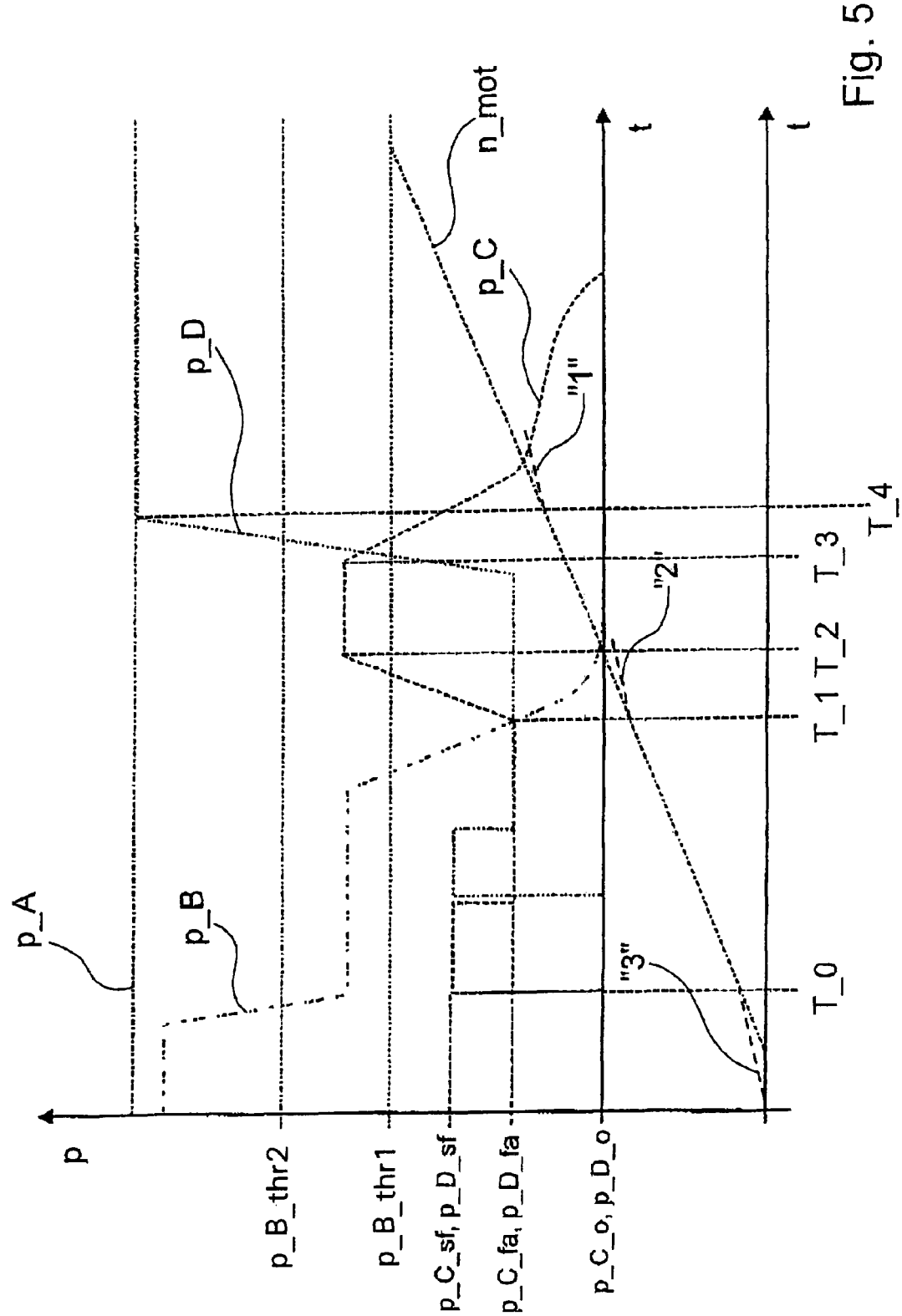
FIG. 5 is several variations of the actuation pressures of shift elements in a transmission during a multiple downshift, during which a valve characteristic of the engagement prevention valve is changed as a function of the operating situation.

Furthermore, FIG. 5 shows, in schematic form, the levels and variations of control pressures p_A, p_B, p_C and p_D of the shift element A, B, C and D involved in a multiple downshift from the third forward gear "3" to the first forward gear "1" and the variation of an engine speed n_mot of an internal combustion engine of a vehicle produced during the multiple downshift.

The level of the control pressure p_A of shift element A is constant over the operating condition variation, shown in FIG. 5, and corresponds essentially to the full shift pressure of shift element A, which is equal to the system pressure p_sys applied by the system pressure valve 4 since shift element A is involved in obtaining all the gears "3", "2" and "1" that participate in the multiple shift.

At a time T_0, the transmission control device emits a shift signal to downshift from the third gear "3" toward the second gear "2" and the control pressure p_B of shift element B falls below the second threshold value p_B_thr 2, so it is possible to engage a second shift element D in order to obtain the reverse gear "R". At approximately the same time, the control pressure p_C of shift element C, which has to be engaged in the force flow of the automatic transmission to obtain the second gear "2", is increased from its opening pressure p_C_o toward its rapid filling pressure p_C_sf and pre-filling takes place during a rapid filling phase in a manner known as such. At the end of the rapid filling phase of the shift element C, the control pressure of shift element D is also increased from its opening pressure p_D_o to its rapid filling pressure p_D_sf and pre-filling takes place during a rapid filing phase.

In the present case, the control pressure p_C of shift element C is reduced at the beginning of the rapid filling phase of shift element D to its filling equalization pressure p_C_fa and at the end of a filling equalization phase at time T_1 it is increased toward the system pressure p_sys, where the transmission capacity of shift element C increases steadily. At a time T_2 the control pressure p_C is kept at a constant level and, at a time T_3, it is reduced toward its opening pressure p_C_o, since there is a further shift signal from the transmission control device to engage the first forward driving gear "1".

At approximately the same time as the reduction of the control pressure p_C, the control pressure p_D of shift element D, in this case before time T_3, is increased from its filling equalization pressure p_D_fa toward the system pressure p_sys and the transmission capacity of shift element D is adjusted so that the first forward driving gear "1" is engaged.

At time T_1, the control pressure p_B of shift element B is already lower than the control pressure p_D or filling equalization pressure p_D_fa of shift element D so that at the moment when shift element D is engaged the transmission capacity of shift element B is virtually zero and shift element B is safely disengaged from the force flow of the automatic transmission.

If there is a defect in the transmission control device, then the energizing of the pressure control valves 5 and A1 to E1 by the transmission control device is interrupted, so that the pressure control valves A1, C1, D1 and E1 are closed while the pressure control valves 5 and B1 are fully open. The result is that the system pressure valve 4 is acted upon by the maximum pilot pressure p_VS_5 of the pressure control valve 5 and the system pressure p_sys adopts a maximum value. At the same time, the pressure regulation valve B3 is acted upon with a full pilot pressure p_VS_B of the pressure control valve B1, so that the pressure regulation valve B3 switches over and the shift element B is acted upon by its full shifting pressure p_A, which in this operating condition of the electro-hydraulic control device 1, corresponds to the system pressure p_sys and, depending on the operating condition of the electro-hydraulic transmission control device at the moment when the transmission control device becomes defective, becomes or remains engaged in the force flow of the automatic transmission.

This emergency operation strategy is based on the fact that, because of the shift strategy described earlier, the shift element B is predefined as an emergency shift element which, to obtain various emergency gears "3", "5", "R", in each case, is engaged in the force flow of the automatic transmission. In fact, an emergency gear is associated with each of the three transmission ratio ranges and the emergency gear, associated with the first transmission ratio range, is the third forward step or third gear "3" to obtain which shift element B and shift element A are simultaneously engaged in the force flow of the automatic transmission.

In addition, the emergency gear associated with the second transmission ratio range is the fifth gear "5" to obtain which the emergency shift element B and shift element E are simultaneously engaged in the force flow of the automatic transmission.

If the electric transmission control device becomes defective while the reverse gear is engaged, then the automatic transmission is left in its operating condition at the moment when the electric transmission control device becomes defective and the shift elements B and D, that must be simultaneously engaged in the force flow in order to obtain the reverse drive gear "R" are acted upon directly by the system pressure p_sys from the system pressure valve 4 or via the gearshift switch 2.

When the transmission control device is active, the shift elements A to E are actuated by the pressure control valves A1 to E1 that can be electrically actuated by the transmission control device. Since the pressure control valves A1 to E1 can no longer be actuated electronically if the transmission control device is de-activated or inactive, and since the shift elements A, C, D and E can then no longer be actuated to the extent required for their engagement via their associated pressure control valves A1, C1, D1, E1 with pilot pressure p_VS_A, p_VS_C, p_VS_D or p_VS_E needed for the switching through of the applied system pressure p_sys, when the transmission control device is inactive other control means are provided as a function of the control pressure p_B of the shift element or emergency shift element B and the operating condition of the automatic transmission at the moment when the transmission control device becomes defective.

To implement a hydraulic emergency concept two switching valves SV_1 and SV_2 are provided which, when the transmission control device is active, are essentially not actively involved in the control of the automatic transmission; below, the switching valve SV_1 will be denoted as the selector switching valve and the switching valve SV_2 as the emergency switching valve.

When the transmission control device is active, the emergency switching valve SV_2 is acted upon in the area of an end face of its valve slide 11 by the pressures p_VS_A, p_VS_D and p_VS_E in such manner that, in all the operating ranges of the automatic transmission, the emergency switching valve SV_2 is held against a spring device 12 in the position, shown in FIG. 1, which corresponds to a first switch position and in which a connection line 13, between the control line 14 of the emergency shift element B and the selector switching valve SV_1 is blocked in the area of the emergency switching valve SV_2.

Of course, it is at the discretion of those with knowledge of the subject to maintain the emergency switching valve SV_2 during normal driving operation in the switch position, shown in FIG. 1, by way of some other pressure signal, such as the pilot pressure p_VS_5 of the pressure control valve 5 by way of which the system pressure p_sys can be modulated.

When the electric transmission control device is inactive, the end face of the valve slide 11 of the emergency switching valve SV_2 is not acted upon by the pilot pressures p_VS_A, p_VS_D or p_VS_E, so the valve slide 11 is pushed by the spring device 12 away from its position shown in FIG. 1 to its second switch position and the connection line 13 in the area of the emergency switching valve SV_2 is unblocked. Thus the control pressure p_B which, when the transmission control device is inactive, corresponds essentially to the system pressure p_sys, is passed on toward the selector switching valve SV_1. In the area of the selector switching valve SV_1 and, depending on the current operating condition of the automatic transmission, the respective other shift element A, E, D which must be engaged in addition to the emergency shift element B in order to obtain a particular emergency gear "3", "5" or "R" is selected.

In the position, shown in FIG. 1, the selector switching valve SV_1 is in the second switch position to which it is switched against a spring device 15 by the applied control pressure p_E of the shift element E in which, when the transmission control device is inactive, the control pressure p_B of the emergency shift element B applied via the connection line 13 is passed to an auxiliary piston 16 of the pressure regulating valve E3. As a result, the auxiliary switching piston 16 of the pressure regulating valve E3 comes in contact with s valve slide 17 of the pressure regulating valve E3 and the valve E3 is switched over so that the system pressure p_sys applied, via a line 18, is passed as the actuating control pressure p_E towards the shift element E.

Since the end face of a valve slide 19 of the selector switching valve SV_1 can be acted upon by a control pressure p_E of shift element E, in all the gears "4", "5", "6" of the second transmission ratio range the selector switching valve SV_1 is in its second switch position shown in FIG. 1. If the transmission control device becomes defective, the control pressure p_B of the emergency shift element B, applied on the selector switching valve SV_1 via the emergency switching valve SV_2, is then passed on to the pressure regulation valve E3 of shift element E. As a result, the system pressure p_sys applied, via the line 18, to the pressure regulation valve E3 is passed on to the shift element E as an actuating control pressure p_E and shift element E is engaged in the force flow of the automatic transmission in addition to the emergency shift element B in order to obtain the emergency gear "5" associated with the second transmission ratio range In this respect, the control circuit of the shift element E constitutes a hydraulic memory storage since, in relation to the control pressure p_E, the control circuit of shift element E is designed to have an inertia such that, in the event of a fault in the transmission control device during an operation condition of the automatic transmission in which, in the transmission, one of the gears "4" to "6" associated with the second transmission ratio range is engaged, the control pressure p_E of the shift element E will remain above a pressure level which maintains the selector switching valve SV_1 in its position shown in FIG. 1 until, in the transmission when the transmission control device has failed, the emergency gear "5" associated with the second transmission ratio range has been engaged.

If the electric transmission control device fails during an operating condition of the automatic transmission in which one of the gears "1" to "3" of the first transmission ratio range is engaged in the automatic transmission, the selector switching valve SV_1 is in its first switch position in which the valve slide 19 of the selector switching valve SV_1, with its end face that can be acted upon by the control pressure p_E, is fully up against the housing of the selector switching valve SV_1. Then, the control pressure p_B of the emergency shift element B which, when the transmission control device is inactive, is switched through via the connection line 13 and the emergency switching valve SV_2 is passed to the pressure regulation valve A3 of shift element A. In that case, an auxiliary switching piston 20 of the pressure regulation valve A3 is acted upon by the control pressure p_B of the emergency shift element B on an end face facing away from a valve slide 21 and is, therefore, switched over in such manner that shift element A is acted upon, via the line 18, by the system pressure p_sys as its actuating pressure p_A, and is engaged in the force flow of the automatic transmission along with shift element B to obtain the emergency gear "3" associated with the first transmission ratio range.

The design of the pressure regulation valves A3 and E3, with their respective auxiliary pistons 16 and 20, makes it possible for the interactions upon the functioning modes of the pressure regulation valves during normal operation of the electro-hydraulic transmission control device 1 in which the transmission control device 1 is active, to be as small as possible. The auxiliary pistons 16 and 20 of the pressure regulation valves E3 and A3 only take over the control function of the pressure control valves A1 and E1 when the transmission control device is inactive since, when the transmission control device is inactive, their control signals are absent.

The valve slide 21 and auxiliary piston 20 of the pressure regulation valve A3 and the auxiliary piston 16 and valve slide 17 of the pressure regulation valve E3, respectively, delimit control spaces 22 and 23 which can be acted upon by the respective pilot pressure p_VS_A or p_VS_E of the corresponding shift element A or E and, on the side of the associated auxiliary piston 20 or 16 facing away from the respective control space 22 or 23, a further control space 24 or 25 is provided in each case which, when the transmission control device is inactive, can be acted upon by the control pressure p_B of the emergency shift element B in the manner described earlier for the emergency actuation of the shift elements A and E.

Of course, instead of using the control pressure p_B of the emergency shift element B, it is at the discretion of those with knowledge of the field to act upon the pressure regulation valve A3 and/or the pressure regulation valve E3 using the pilot pressure p_VS_B of the emergency shift element B and if necessary engage the corresponding shift element in the force flow of the transmission as described earlier.

In the electro-hydraulic control device 1 represented in the drawing, a third transmission ratio range with a further emergency gear is included in the emergency shift concept. This third transmission ratio range comprising the reversing gear "R" and the emergency gear associated with the third transmission ratio range being the reversing gear "R" itself to obtain which the shift element B and the shift element D in the transmission are simultaneously engaged in the force flow of the automatic transmission whereas the other shift elements A, C and E are disengaged so that they can transmit essentially no torque.

Thus, the reversing gear "R" is obtained by simultaneously engaging the emergency shift element B which functions as the first reversing shift element B and the shift element D, which will be denoted in what follows as the second reversing shift element. When the transmission control device is active, the emergency shift element B and the second reversing shift element D can be engaged via the respective corresponding pressure control valves B1 and D1 or by the respective pilot pressures p_VS_B and p_VS_D produced by them.

When the transmission control device is inactive, the pressure control valve D1 associated with the reversing shift element D is closed so that the pilot pressure p_VS_D that can be produced by the said pressure control valve D1 is at least approximately zero. For that reason, when the transmission control device is inactive, to obtain the emergency gear "R" associated with the third transmission control range the reversing shift element D is actuated by a pressure signal switched through by the gearshift switch 2 in the area of the emergency shift element SV_2 to the area of the switching valves D2A, D2B and the pressure regulation valves D3A, D3B, when the gearshift switch 2 is shifted to a position "Pos P" equivalent to reversing. Then, the system pressure p_sys applied by the system pressure valve 4 via the switching valve SV_3 to the pressure regulation valves D3A, D3B is passed on toward the shift element D.

In the manner described earlier, the emergency shift element B is actuated via the pressure control valve B1 which is open when not energized and via the pressure regulation valve B3, with the actuating control pressure p_B which corresponds essentially to the system pressure p_sys. Although it is true that in the manner described earlier the shift elements A and E are actuated as a function of the switch position of the selector switching valve SV_1, the system pressure p_sys is not applied to these shift elements when the gearshift lever is in position "Pos P", so the shift elements A and E are not engaged.

When the transmission control device is active and the reverse drive gear "R" is engaged, the emergency switching valve SV_2 is held in its first switch position as a function of the pilot pressure p_VS_D of the reversing shift element D, or alternatively as a function of a pressure signal coming from the gearshift lever 2; in this first switch position the connection line 13 is blocked in the area of the emergency switching valve SV_2.

The emergency shift concept described above and that can be implemented with the electro-hydraulic control device 1 according to FIG. 1 to FIG. 3 for the transmission ratio ranges for forward driving and for reverse drive, has the advantage that the shift elements A and E which are respectively engaged in combination with the emergency shift element B to obtain the emergency gears "3" and "5" of the two transmission ratio ranges for forward driving, are, when the transmission control device is inactive, only acted upon when the gearshift lever 2 is in a position equivalent to forward driving, with the respective actuating control pressure p_A or p_E required for their engagement, and the reverse drive shift element D, which is engaged in the force flow in combination with the emergency shift element B to obtain the emergency gear "R" associated with the third transmission ratio range, is only acted upon with the control pressure p_D required for its engagement when the gearshift switch 2 is in a position appropriate for reverse drive. Accordingly, any erroneous actuation of the shift elements A, B, D and E is effectively prevented in a simple and inexpensive manner, both when the electro-hydraulic control device 1 of FIGS. 1 to 3 is operating normally and when it is operating in an emergency situation.

Basically, with the example embodiment of the control device 1, illustrated in the drawing, a change from the emergency gear "5" of the second transmission ratio range, which contains the gears "4" to "6" used in order to produce higher vehicle speeds, to the emergency gear "3" of the first transmission ratio range which, in turn, contains the gears "1" to "3" that are engaged at lower vehicle speeds, can only be made by switching the selector switching valve SV_1 over from its second to its first switch position.

The selector switching valve SV_1 can basically be switched over only when the pressure signal from shift element E, applied to the selector switching valve SV_1, has fallen significantly for the selector switching valve SV_1 to switch over and the control pressure p_B of shift element B is passed from the selector switching valve SV_1, instead of to the pressure regulation valve E3 of shift element E, toward the pressure regulation valve A3 of shift element A, with the ultimate result that shift element A is acted upon by the actuating control pressure p_A required for its engagement.

The pressure signal applied at the selector switching valve SV_1 can be interrupted, for example by switching off the engine of the vehicle or by briefly moving the gearshift switch 2 to the neutral position "Pos N". When the pressure signal is absent, the selection switching valve SV_1 switches over under the action of its spring device 15.

Furthermore, in another advantageous embodiment (not illustrated here), the selector switching valve SV_1 can be made with a hydraulic or mechanical self-maintaining device, which is actively reset by the gearshift switch 2 by moving the latter to the "Pos R" position for reversing, which results in a shift to the emergency reversing gear "R", and after the selector switching valve SV_1 has been restored to its starting position, then engaging the lower emergency gear "3" in the automatic transmission after moving the gearshift lever of the gearshift switch 2 to the appropriate position.

In all the example embodiments of the control device illustrated in the drawing, the auxiliary pistons 16 and 20 of the pressure regulation valves E3 and A3 can be made stepped so that, by virtue of the diameter variation of the auxiliary pistons 16 and 20, the control pressure applied respectively to the shift element A or E engaged can be adapted for the corresponding emergency gear "3" or "5". This is necessary so as to keep the component loading of the shift elements A or E during emergency operation of the electro-hydraulic transmission control device 1 as low as possible, and to make the engagement of the emergency gears "3" or "5" correspondingly gentle by a corresponding slipping phase of the shift elements A or E during their engagement process. This procedure stems from the knowledge that owing to the dynamic forces that act during the emergency shift, brought about for example by the speed changes caused by changing the transmission ratio in the transmission, components of the automatic transmission can be loaded to an unacceptable extent.

Figure 6:
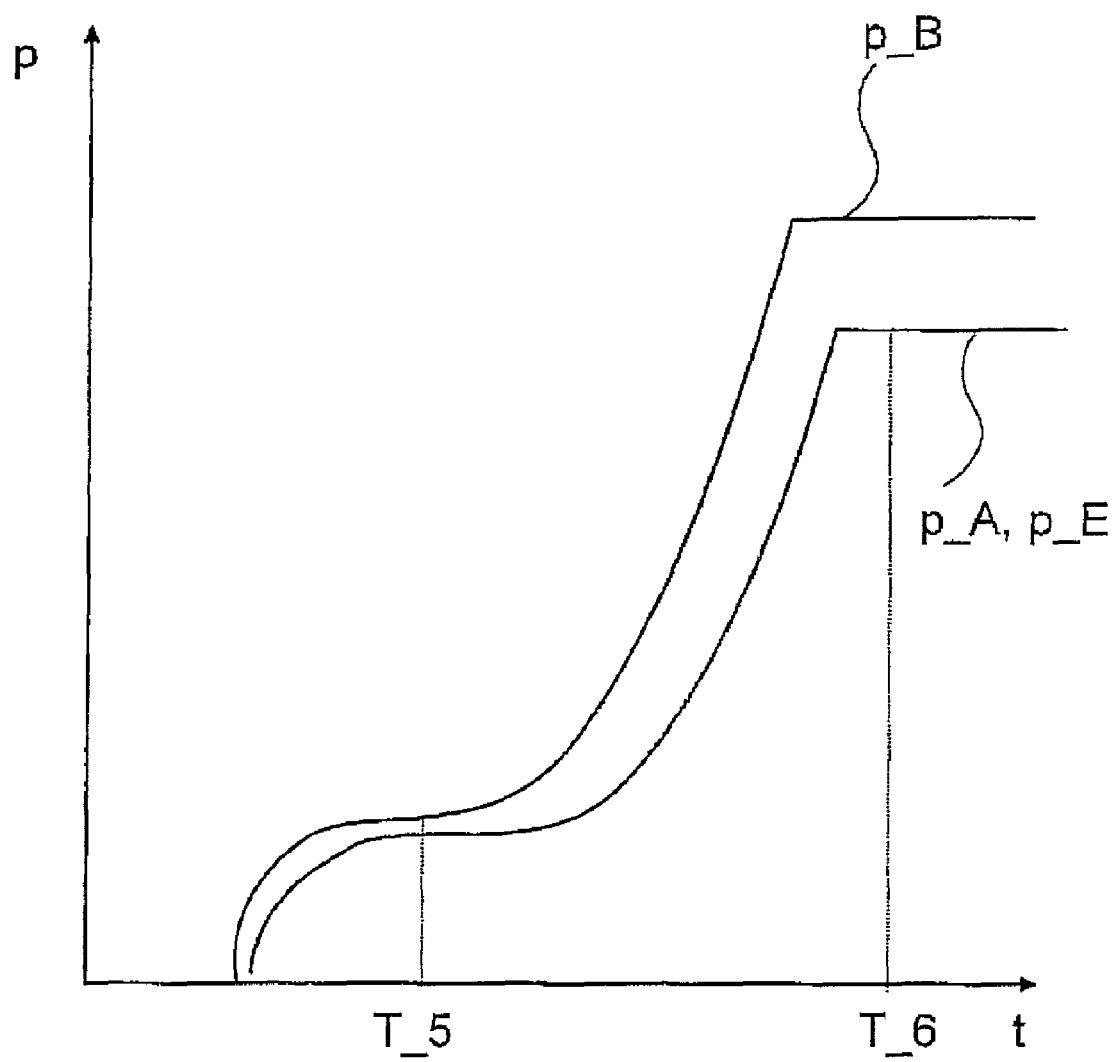
FIG. 6 is a comparison of variations of the actuating pressure of the control elements, to illustrate emergency gear ratios during the engagement of the said shift elements in the emergency operation of the control device according to the invention shown in FIG. 2 and FIG. 3.

FIG. 6 shows the variation of the control pressure p_B of the emergency shift element B compared with the variation of the control pressures p_A and p_E of the shift elements A and E when the transmission control device is inactive. From the graphical comparison of the shift pressures p_A, p_B and p_E of shift elements A, B and E, it can be seen that at the end of its engagement the emergency shift element B is acted upon by the full system pressure p_sys. In their engaged condition, the shift elements A and E are acted upon by a shift pressure lower compared with the system pressure p_sys, which results from the area ratio set at the auxiliary pistons 16 and 20. This simple design measure has the advantage that at the time T_5, shown in FIG. 6, the shift elements A and E first go into their slipping operation mode, which ends at a time T_6. This slipping operation of the shift elements A and E, which is lengthy compared with normal driving operation, makes for harmonious and low-load engagement of the shift elements A and E which, in a simple manner, can avoid damaging components of the automatic transmission.

REFERENCE NUMERALS 1 electro-hydraulic transmission control device 2
1A hydraulic control system
2 gearshift switch
3 hydraulic pump
4 system pressure valve
5 pressure control valve
6 reducing valve
7 OR valve
8 OR valve
9 pressure limiting valve
10 oil sump
11 valve slide of the emergency switching valve
12 spring device of the emergency switching valve
13 connection line
14 control line
15 spring device of the selector switching valve
16 auxiliary switching piston of the pressure regulation valve E3
17 valve slide of the pressure regulation valve E3
18 line
19 valve slide of the selector shifting valve
20 auxiliary piston of the pressure regulation valve A3
21 valve slide of the pressure regulating valve A3
22 control space of the pressure regulating valve A3
23 control space of the pressure regulating valve E3
24 further control space of the pressure regulating valve A3
25 further control space of the pressure regulating valve E3
26 spring device of the engagement prevention valve SV_3
27 pressure supply line of the engagement prevention valve SV_3
28 valve slide of the engagement prevention valve SV_3
29 control space of the engagement prevention valve SV_3
30 OR valve
31 pilot pressure line
32 pilot pressure line
A shift element
A1, B1, C1, D1, E1 pressure control valves
A2, D2A, D2B, E2 switching valves
A3, B3, C3, D3A, D3B, E3 pressure regulation valves
B shift element, emergency shift element, first reversing shift element
C shift element
D shift element, second reversing shift element
E shift element
n_mot engine speed
p_red control pressure
p_C_o, p_D_o opening pressures
p_C_fa, p_D_fa filling equalization pressures
p_C_sf, p_D_sf rapid filling pressures
p_VA_A to p_VS_E pilot pressures
p_VS_5 pilot pressure
p_A to p_E actuation control pressures
p_sys system pressure
"1" to "6" forward driving gears
"R" reverse drive
"Pos D", "Pos N" selector lever positions
"Pos R", "Pos P" selector lever positions
p_B_thr 1 first pressure threshold valve
p_B_thr 2 second pressure threshold valve
SV_1 selector switching valve
SV_2 emergency switching valve
SV_3 switching valve, engagement prevention valve
T_0 to T_6 time

The invention claimed is:

1. A control device (1) for an automatic transmission of a vehicle, having a hydraulic control system that is controllable by an electric transmission control device, the control device comprising:

a plurality of pressure control valves (5, A1, B1, C1, D1, E1), each being electrically actuated by the transmission control device;

a plurality of switching valves (A2, D2A, D2B, E2, SV_1, SV_2, SV_3) and a plurality of pressure regulation valves (A3, B3, C3, D3A, D3B, E3), each being actuated by at least one of a plurality of hydraulic pilot pressures (p_VS_5, p_VS_A, p_VS_B, p_VS_C, p_VS_D, p_VS_E);

the plurality of hydraulic pilot pressures (p_VS_5, p_VS_A, p_VS_B, p_VS_C, p_VS_D, p_VS_E) are set by one of the plurality of pressure control valves (5, A1, B1, C1, D1, E1) such that the hydraulic control system, depending on a gearshift lever position ("Pos D", "Pos R", "Pos N", "Pos P") of a manual gearshift switch (2), enables application of a hydraulic actuation control pressure (p_A, p_B, p_C, p_D, p_E) of at least two of a plurality of shift elements (A, D; A, C; A, B; A, E; B, E; C, E; B, D) to one of engage and disengage a variety of gears ratios ("1", "2", "3", "4", "5", "6", "R") for implementing at least one of a forward drive and a reverse drive, each of the plurality of shift elements (A to E) is associated with one of the plurality of pressure control valves (5, A1, B1, C1 D1, E1);

at least one reverse drive gear ratio ("R") being implemented by simultaneous engagement of first and second shift elements (B, D);

simultaneous engagement of the first shift element (B), the second shift element (D) and at least one other of the plurality of shift elements (A, E) implements one gear ratio ("1", "3", "5") for forward drive; and an engagement prevention valve (SV_3) being actuated by a control pressure (p_B) of the first shift element (B), against a spring device (26), in a direction of a first switch position to obtain the reverse drive gear ratio ("R") and the engagement prevention valve (SV_3) is actuated in a direction of a second switch position by a pressure signal (p_sys) equivalent to the control pressure (p_B) of the first shift element (B) for implementing the reverse drive gear ratio ("R"); and a pressure supply line (27; 32) of the second shift element (D) being blocked when the engagement prevention valve (SV_3) is in the first switch position and being open when the engagement prevention valve (SV_3) is in the second switch position.

2. The control device according to claim 1, wherein an actuation control pressure (p_D) is provided, via the pressure supply line (27), for engaging the second shift element (D) to implement the reverse drive gear ratio ("R").

3. The control device according to claim 1, wherein a pilot pressure (p_VS_D) is supplied, via the pressure supply line (32), for actuating at least one of a pressure regulation valve (D3A, D3B) associated with the second shift element (D) and the shift valve (D2A, D2B) associated with the shift element (D) to implement the reverse drive gear ratio ("R").

4. The control device according to claim 1, wherein the pressure signal (p_sys) at least approximately corresponds to a system pressure (p_sys) set by a system pressure valve (4).

5. The control device according to claim 1, wherein at least when the gearshift lever is in a reverse drive position ("Pos R"), the pressure signal (p_sys) is passed, via the gearshift switch (2), to the engagement prevention valve (SV_3).

6. The control device according to claim 1, wherein when the transmission control device is inactive, a pressure control valve (B1) of the first shift element (B) for obtaining the reversing gear ("R") is open and a pressure regulation valve (B3) of the first reversing shift element (B) is actuated by the pilot pressure (p_VS_B) to engage the first reversing shift element (B).

7. The control device according to claim 1, wherein when the transmission control device is inactive, a pressure control valve (D1) of the second shift element (D) for obtaining the reversing gear ("R") is closed and pressure regulation valves (D3A, D3B) and switching valves (D2A, D2B) of the second reversing gear shift element (D) are not actuated by a pilot pressure (p_VS_D) provided by an associated pressure control valve (D1).

8. The control device according to claim 1, wherein when the transmission control device is inactive, a second pressure control valve (D3A, D3B) and a second switching valve (D2A, D2B) of the second reversing shift element (D) are controlled by the system pressure (p_sys) applied to the second pressure regulation valve (D3A, D3B) and the second switching valve (D2A, D2B), via the gearshift switch (2), when the gearshift lever is in a reverse gearshift lever position ("Pos R"), such that a second actuation control pressure (p_D) is applied to the second reversing shift element (D) to implement engagement thereof.

9. The control device according to claim 1, wherein a pressure signal (p_sys) for controlling a second pressure regulation valve (D3A, D3B) and for controlling a second switching valve (D2A, D2B) of the second reversing shift element (D) when the transmission control device is inactive, is passed to the second pressure regulation valve (D3A, D3B) and the second switching valve (D2A, D2B), via an emergency switching valve (SV_2), and a connection between the gearshift switch (2) and the second pressure regulation valve (D3A, D3B) and between the gearshift switch (2) and the second switching valve (D2A, D2B) is blocked in an area of the emergency switching valve (SV_2) when the transmission control device is active.

10. The control device according to claim 1, wherein the engagement prevention valve (SV_3) is additionally actuated in the direction of the second switch position by a further pressure signal (p_VS_A), when the transmission control device is active, to vary a valve characteristic.

11. The control device according to claim 10, wherein the further pressure signal (p_VS_A) corresponds to a pilot pressure (p_VS_A) controlled by a third pressure control valve (A1) which is closed in a de-energized condition.

12. The control device according to claim 10, wherein the further pressure signal (p_VS_A) and the pressure signal are applied on individual active surfaces of a valve slide of the engagement prevention valve (SV_3).

13. The control device according to claim 10, wherein the further pressure signal (p_VS_A) is applied to a common active surface of a valve slide (28) of the engagement prevention valve (SV_3) as the pressure signal (p_sys), and the further pressure signal (p_VS_A) is applied to the common active surface as alternatives, via an OR valve (30).

* * * * *